(12) United States Patent
Neuhoff, Jr. et al.

(10) Patent No.: US 10,485,193 B2
(45) Date of Patent: Nov. 26, 2019

(54) AUTOMATED HYDROPONICS SYSTEM AND METHOD

(71) Applicants: Robert V. Neuhoff, Jr., Irving, TX (US); Joseph H. Murdler, Farmers Branch, TX (US)

(72) Inventors: Robert V. Neuhoff, Jr., Irving, TX (US); Joseph H. Murdler, Farmers Branch, TX (US)

( * ) Notice: Subject to any disclaimer, the term of this patent is extended or adjusted under 35 U.S.C. 154(b) by 371 days.

(21) Appl. No.: 15/166,266

(22) Filed: May 27, 2016

(65) Prior Publication Data

US 2017/0055461 A1 Mar. 2, 2017

Related U.S. Application Data

(60) Provisional application No. 62/167,804, filed on May 28, 2015.

(51) Int. Cl.
*A01G 31/04* (2006.01)
*A01G 31/06* (2006.01)

(52) U.S. Cl.
CPC .......... *A01G 31/042* (2013.01); *A01G 31/06* (2013.01)

(58) Field of Classification Search
CPC ...... A01G 31/042; A01G 31/06; A01G 31/04; Y02P 60/216
USPC .......................................................... 47/59 R
See application file for complete search history.

(56) References Cited

U.S. PATENT DOCUMENTS

| 2,849,835 | A | * | 9/1958 | Huff | A01G 31/06 424/665 |
| 3,284,948 | A | * | 11/1966 | Kyle | A01G 31/042 119/14.03 |
| 3,425,158 | A | * | 2/1969 | Kyle | A01G 31/042 226/170 |
| 3,432,965 | A | * | 3/1969 | Smith | A01G 31/045 47/60 |
| 4,068,405 | A | * | 1/1978 | Campbell | A01G 31/045 47/65 |
| 4,356,664 | A | * | 11/1982 | Ruthner | A01G 31/042 47/17 |
| 4,486,977 | A | * | 12/1984 | Edgecombe | A01G 31/02 47/59 R |
| 5,323,567 | A | * | 6/1994 | Nakayama | A01G 7/045 47/63 |
| 6,374,537 | B1 | * | 4/2002 | Van Wingerden | A01G 9/143 47/17 |

(Continued)

FOREIGN PATENT DOCUMENTS

| CA | 2978143 A1 * | 10/2016 | ............. B65G 57/03 |
| DE | 3404300 A1 * | 8/1985 | ............. A01G 31/06 |

(Continued)

*Primary Examiner* — Magdalena Topolski
*Assistant Examiner* — Morgan T Barlow
(74) *Attorney, Agent, or Firm* — John J. Patti; Miller Patti Pershem, PLLC

(57) ABSTRACT

A method is provided. In this method, a first tray positioned at a first end of a trough assembly at a selected tier is engaged. The first tray is then lifted and removed. A second tray is then engaged and moved vertically to the selected tiers. It is placed in the trough assembly at a second end. Other trays—which are positioned within the trough assembly between the first and second ends of the selected tier—are moved toward the first end of the trough assembly.

15 Claims, 7 Drawing Sheets

(56) References Cited

U.S. PATENT DOCUMENTS

| | | | | |
|---|---|---|---|---|
| 8,627,598 B1 * | 1/2014 | Souder | ............... | A01G 31/042 47/1.01 R |
| 10,004,187 B1 * | 6/2018 | Van Wingerden | ...... | A01G 31/06 |
| 2009/0307973 A1 * | 12/2009 | Adams | ............... | A01G 31/06 47/62 C |
| 2013/0326950 A1 * | 12/2013 | Nilles | ............... | A01G 31/06 47/62 R |
| 2014/0115960 A1 * | 5/2014 | Kantola | ............... | A01G 31/00 47/66.7 |
| 2015/0250115 A1 * | 9/2015 | Pickell | ............... | A01G 31/042 47/62 R |
| 2016/0192607 A1 * | 7/2016 | Kitagawa | ............... | A01G 31/02 47/62 E |
| 2016/0262324 A1 * | 9/2016 | Yamane | ............... | A01G 31/06 |
| 2016/0366845 A1 * | 12/2016 | Visser | ............... | A01G 24/00 |
| 2017/0055461 A1 * | 3/2017 | Neuhoff, Jr. | ............... | A01G 31/042 |
| 2018/0007850 A1 * | 1/2018 | Dufresne | ............... | A01G 31/06 |
| 2018/0035624 A1 * | 2/2018 | Itoh | ............... | A01G 31/06 |
| 2018/0042192 A1 * | 2/2018 | Volpe | ............... | A01G 7/045 |

FOREIGN PATENT DOCUMENTS

| | | | | | |
|---|---|---|---|---|---|
| DE | 102014014244 A1 | * | 3/2016 | ............. | A01G 31/06 |
| FR | 1150195 A | * | 1/1958 | ............. | A01G 31/06 |
| FR | 2561493 A2 | * | 9/1985 | ............. | A01G 31/06 |
| FR | 3053569 A1 | * | 1/2018 | ........... | A01G 31/042 |
| GB | 1374076 A | * | 11/1974 | ............. | A01G 31/06 |
| GB | 1518757 A | * | 7/1978 | ............. | A01G 31/06 |
| JP | 2012210185 A | * | 11/2012 | ........... | A01G 31/042 |
| JP | 2016208948 A | * | 12/2016 | ............... | A01G 9/02 |
| WO | WO2004093527 | | 11/2004 | | |
| WO | WO-2010122183 A1 | * | 10/2010 | ........... | A01G 31/042 |
| WO | WO-2011080819 A1 | * | 7/2011 | ........... | A01G 31/042 |
| WO | WO-2012005121 A1 | * | 1/2012 | ........... | A01G 31/042 |
| WO | WO-2012118159 A1 | * | 9/2012 | ........... | A01G 31/042 |
| WO | WO2014009842 | | 1/2014 | | |
| WO | WO-2016023948 A1 | * | 2/2016 | ........... | A01G 31/042 |
| WO | WO-2017030524 A1 | * | 2/2017 | ............. | A01G 31/06 |
| WO | WO-2017169389 A1 | * | 10/2017 | ............... | A01G 9/00 |

* cited by examiner

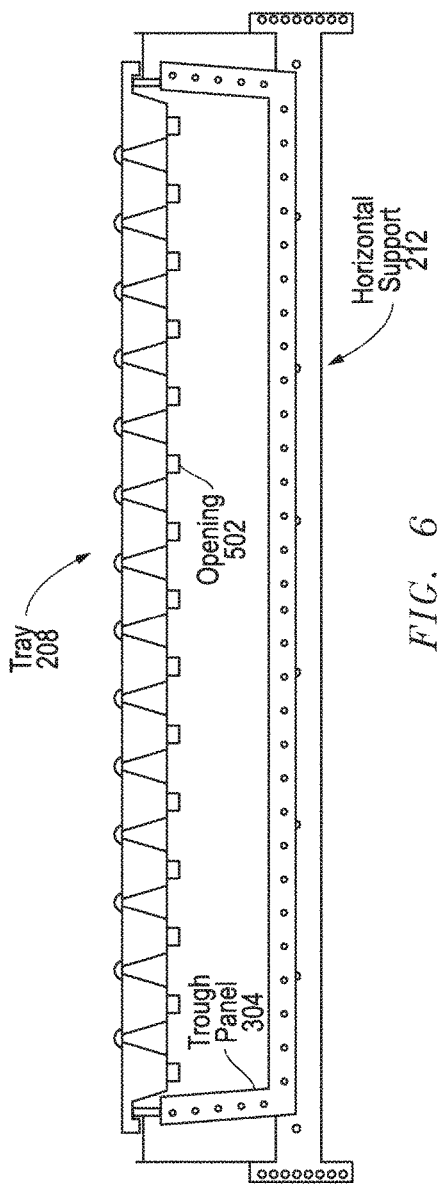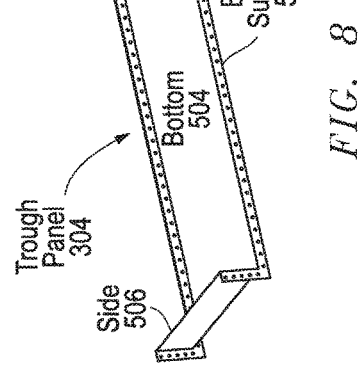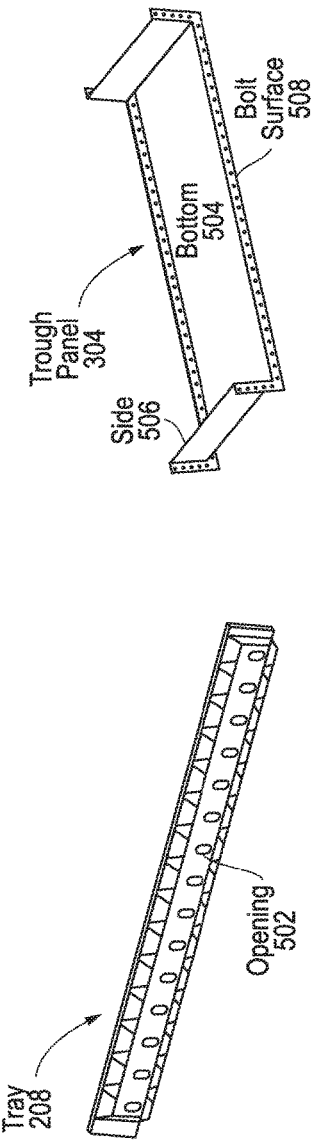
FIG. 6
FIG. 8
FIG. 7

AUTOMATED HYDROPONICS SYSTEM AND METHOD

CROSS-REFERENCE

This application claims priority to U.S. Provisional Patent Application No. 62/167,804 filed on May 28, 2015, which is hereby incorporated by reference in its entirety.

TECHNICAL FIELD

The present application relates generally to hydroponic systems and, more specifically, to an automated hydroponics system that increases production.

BACKGROUND

Indoor and outdoor controlled agricultural environments are used to increase crop production and reliability. Controlled agricultural environments, for example, protect crops from natural disasters and draught, more effectively utilize land, decrease water consumption, effectively grow crops normally out of season or in otherwise non-ideal environments, and reduce insects, birds, and micro-organisms from destroying crops while reducing the use of pesticides. Some controlled agricultural environments use hydroponic systems. Some examples of such systems and methods are: U.S. Pat. No. 4,486,977; PCT Publ. No. WO2004093527; and PCT Publ. No. WO2014009842.

One type of hydroponic system, in particular, that is currently used is aquaponics. Typically, aquaponic systems utilize a symbiotic integration of aquaculture (such as raising aquatic animals including snails, fish, crayfish, prawns, or the like in tanks) and hydroponics (such as cultivating plants in water). In aquaponic systems, such as recirculating aquaponic (RA) systems, liquid effluent (such as a liquid rich in plant nutrients and derived from fish manure, decomposing organic matter, and nitrogenous waste excreted from fish fertilizes hydroponic bed) provides nourishing elements to grow plants.

FIG. 1 illustrates a conceptual example of an RA system 100. As illustrated, the system 100 includes a fish-rearing tank 105, a suspended solids removal unit 110, a biofilter 115, a hydroponic subsystem 120, and a sump 125. Effluent liquid from the fish-rearing tank 105 is treated in the suspended solids removal unit 110. The effluent liquid, now cultured water, is treated at the biofilter 115 using nitrification to remove ammonia and nitrite. The water then flows to the hydroponic subsystem 120 where some dissolved nutrients are taken up by plants and additional ammonia and nitrite are removed by bacteria growing on the sides of a tank in the hydroponic subsystem 120. After exiting the hydroponic subsystem 120, the water collects in the sump 125 and is returned to the fish-rearing tank 105.

To implement this, there are a variety of techniques that can also employed. Some examples of these techniques are:

Deep water culture (DWC) where a floatation devices positions crops on the surface of a water basin (where the water can be recirculated);

Nutrient film technique (NFT) where a sloped basin drips or trickles liquid effluent or water to crops positioned along the basin;

Ebb and Flow (EB) (or a Flood Drain technique) where crop roots are suspended above the media bed containing nutrient rich water. When the nutrient rich water reaches the upper threshold height, the nutrient rich water drains from the media bed into a drainage bed positioned below the media bed until the height of the nutrient rich water falls to a lower threshold height;

Aeroponics where crop roots are suspended in a growing chamber with spray nozzles which spray nutrient rich water onto the roots;

Drip system where nutrient rich water is dripped onto the crops (similar to commonly used drip irrigation systems) and the waste water is recirculated; and Wick system where nutrient rich water is introduced to growing trays through the use of a wick.

Additionally, the following documents and standards descriptions are hereby incorporated by reference herein: James E. Rakocy, Michael P. Masser, and Thomas M. Losordo, "Recirculating Aquaculture Tank Production Systems: Aquaponics—Integrating Fish and Plant Culture," November 2006 Revision, Southern Regional Aquaculture Center (SRAC) Publication No. 454 (REF 1); Fox, B. K., Tamaru, C. S., Hollyer, J., Castro, L. F., Fonseca, J. M., Jay-Russell, M., & Low, T. (2012). A Preliminary Study of Microbial Water Quality Related to Food Safety in Recirculating Aquaponic Fish and Vegetable Production Systems. University of Hawai'i at Manoa (REF 2); Burden, D. Agricultural Marketing Resource Center. Agricultural Marketing Resource Center. July 2013 (REF 3); Wire, B. Research and Markets: 2012 Report Analyzing the Fertilizer Industry in United States 2011-2016. Mar. 16, 2012. (REF 4); United States Government Publishing Office—Public Law 111-353—Jan. 4, 2011, 124 STAT. 3885 (REF 5).

There is, however, one common issue that plagues hydroponics and agriculture in general, and that is labor. Agriculture is (in general) labor intensive in that it often requires the touch of human hands. Therefore, there is a need for a method and/or apparatus for automating hydroponics.

SUMMARY

An embodiment is accordance with the disclosure provides an apparatus. The apparatus comprises: a frame having a plurality of tiers; a plurality of trough assemblies, wherein each trough assembly is secured to the frame and positioned in at least one of the tiers, and wherein each trough assembly includes at least one reservoir dimensioned by first and second end plates with at least one trough segment secured therebetween; a load assembly that is secured to the frame, wherein the load assembly is secured to the frame and is configured to access each of the tiers, and wherein the load assembly includes first and second arm that are spaced apart at a predetermined distance dimensioned so as to load or unload at least one tray from at least one of the trough assemblies; a plurality of conveyor assemblies, wherein each conveyor assembly is secured to the frame and is associated with at least one tier, and wherein each conveyor assembly is configured to engage and transfer at least one tray across its associated trough assembly; a feed assembly that is configured to provide nutrient laden water to the plurality of trough assemblies.

An embodiment is accordance with the disclosure provides the trough assembly further comprising first and second tracks that are configured to engage at least one tray.

An embodiment is accordance with the disclosure provides the frame further comprising: a plurality of frame sections, wherein each frame section includes a plurality of vertical support members interconnected to a plurality of cross support members; and a plurality of horizontal support members, wherein each horizontal support member is secured to at least two frame sections, and wherein each horizontal support member spans the distance between its associated frame sections, and wherein the plurality of horizontal support members are divided into a plurality of sets of horizontal frame members, and wherein each set of horizontal frame members forms at least one of the tiers.

An embodiment is accordance with the disclosure provides that each of the first and second arms of the load assembly further comprises a lift assembly, wherein each lift assembly is secured to at least one of the vertical support members so as to allow its arm to access each of the tiers.

An embodiment is accordance with the disclosure provides that the first and second tracks further comprise low-friction skid tracks.

An embodiment is accordance with the disclosure provides that each of the first and second tracks further comprises: a u-shaped channel; and a plurality of roller bearings, wherein the roller bearings are secured within the u-shaped channel.

An embodiment is accordance with the disclosure provides that each conveyor assembly further comprises: an engagement assembly that is adapted to engage at least one tray; a pulley assembly; and a belt that is secured to the engagement and pulley assemblies.

An embodiment is accordance with the disclosure provides a method. The method comprises: engaging a first tray having a first set of plants positioned therein, wherein the first tray is positioned at a first end of a trough assembly secured at a selected tier; lifting and removing the first tray from the trough assembly; moving a plurality of third trays positioned within the trough assembly toward the first end of the trough assembly; engaging a second tray having a plurality of plants positioned therein; moving the second tray vertically to the selected tiers; and placing the second tray in the trough assembly, wherein the second tray is positioned at a second end.

An embodiment is accordance with the disclosure provides that the step of engaging the first tray further comprises engaging first and second ends of the first tray with first and second load arms, respectively.

An embodiment is accordance with the disclosure provides that the step of lifting and removing the first tray further comprises: activating first and second lift assemblies to so as raise the first tray with the first and second load arms; and moving the first tray from a first horizontal position to a second horizontal position with the first and second load arms.

An embodiment is accordance with the disclosure provides that the step of engaging the second tray further comprises engaging first and second ends of the second tray with third and fourth load arms, respectively.

An embodiment is accordance with the disclosure provides that the step of moving the second tray further comprises activating third and fourth lift assemblies to so as raise the second tray with the third and fourth load arms to the selected tier.

An embodiment is accordance with the disclosure provides an apparatus. The apparatus comprises: a frame having a plurality of tiers; a plurality of trough assemblies, wherein each trough assembly is secured to the frame and positioned in at least one of the tiers, and wherein each trough assembly includes: a first end plate; a plurality of trough segments that are secured to one another in a sequence, wherein the first end plate is secured to the first trough segment of the sequence; and a second end plate that is secured to the last trough segment of the sequence; a plurality of sets of trays, wherein each set of trays is positioned within at least one of the trough assemblies and extends across the approximate length of its trough assembly; a first and second load assemblies that are secured to the frame at first and second ends, wherein each load assembly is configured to access each of the tiers, and wherein the assembly includes first and second arm that are spaced apart at a predetermined distance dimensioned so as to load or unload at least one of the trays from at least one of the trough assemblies; a plurality of conveyor assemblies, wherein each conveyor assembly is secured to the frame and is associated with at least one tier, and wherein each conveyor assembly is configured to engage and transfer at least one tray across its associated trough assembly; a feed assembly that is configured to provide nutrient laden water to the plurality of trough assemblies.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a cross-sectional view of an in situ trough assembly of FIG. 2 with a tray in place;

FIG. 7 is an isometric view of an example of a tray shown in FIG. 2;

FIG. 8 is an isometric view of an example of a trough segment; and

DETAILED DESCRIPTION

Figure 1:
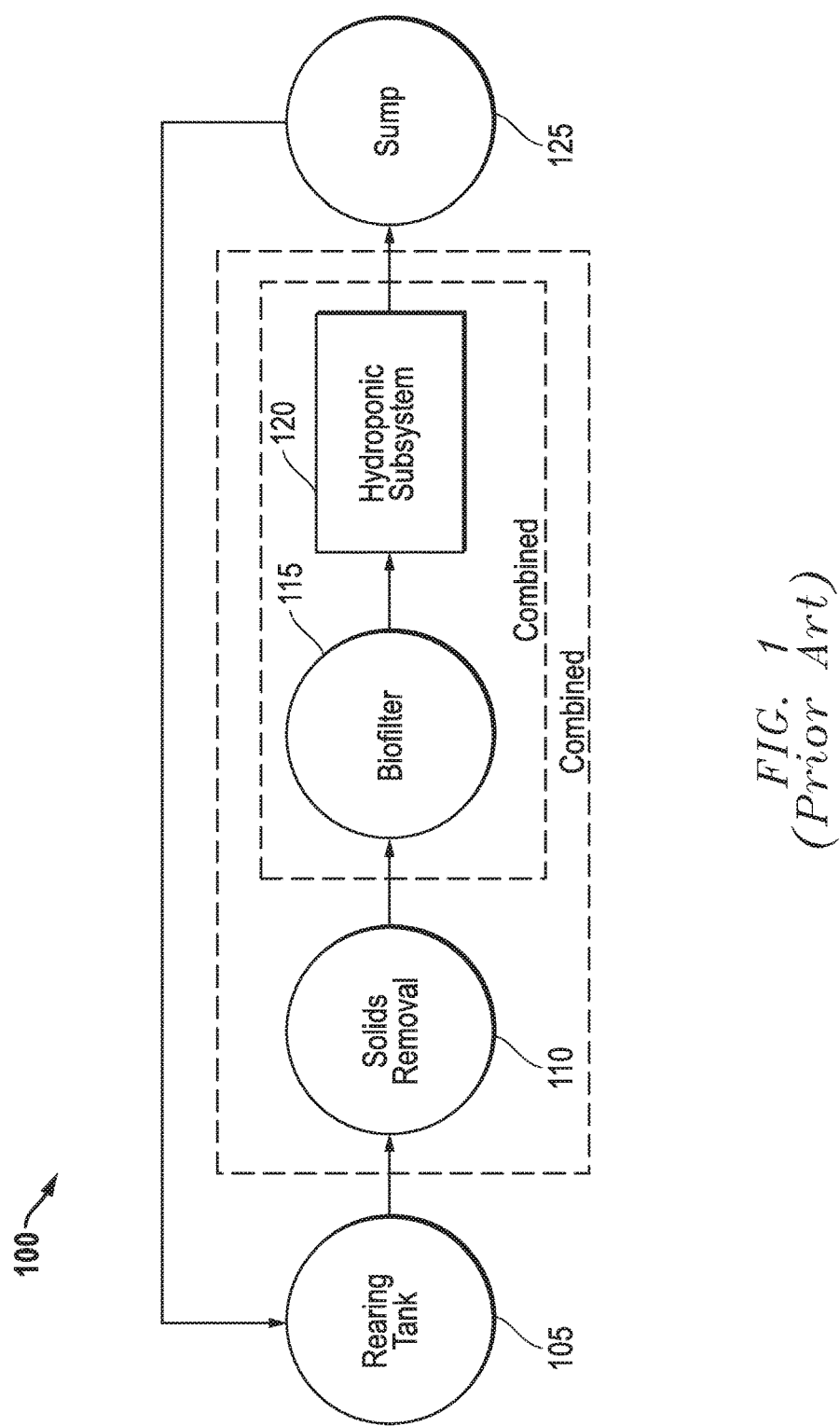
FIG. 1 illustrates a conceptual example of a conventional recirculating aquaponics system.
Figure 2:
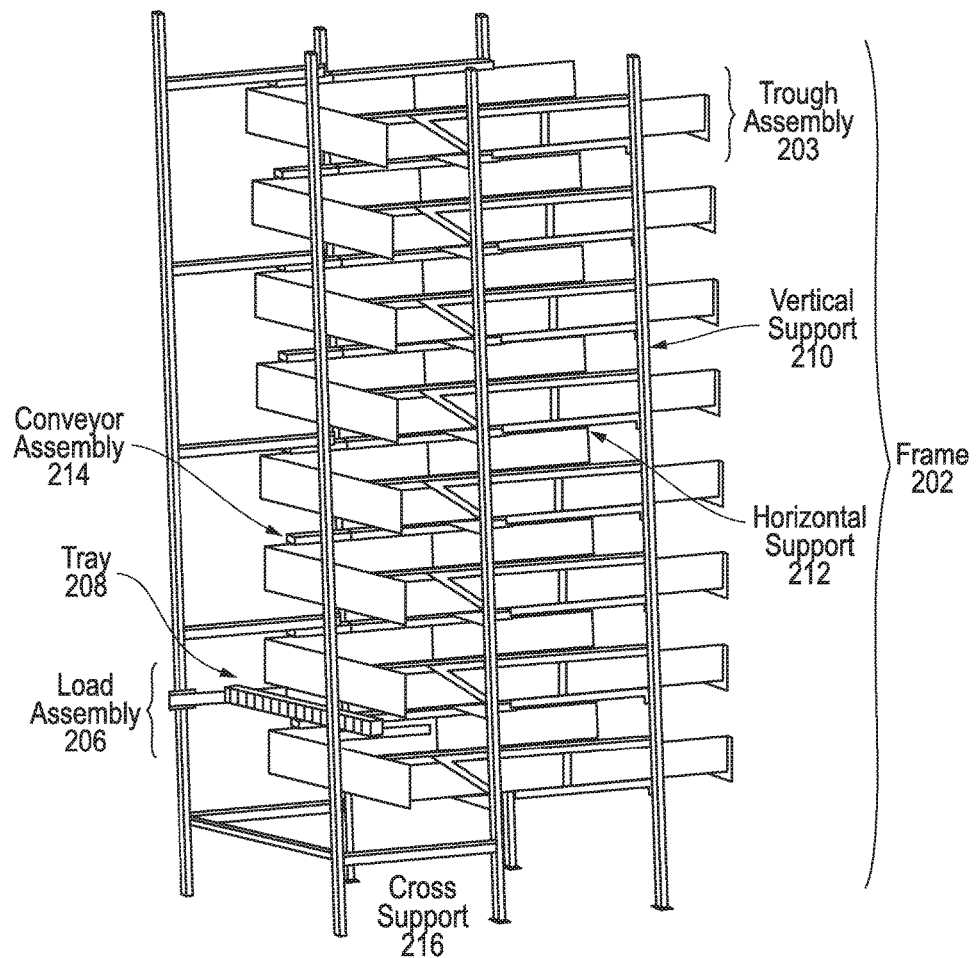
FIG. 2 is an example of a portion of an aquaponics automation system in accordance with the disclosure.
Figure 3:
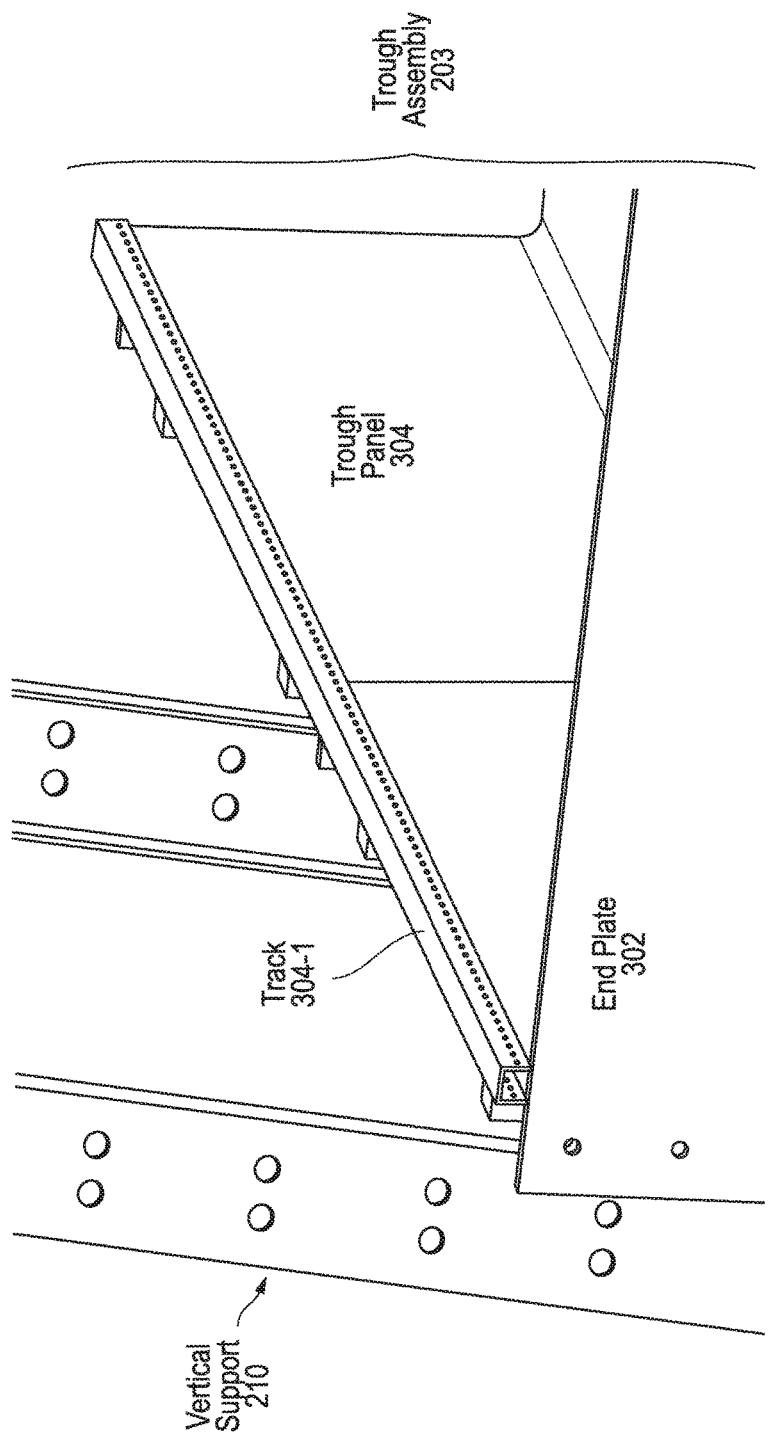
FIGS. 3 and 4 are magnified views of alternative examples of the trough assembly of FIG. 2.
Figure 4:
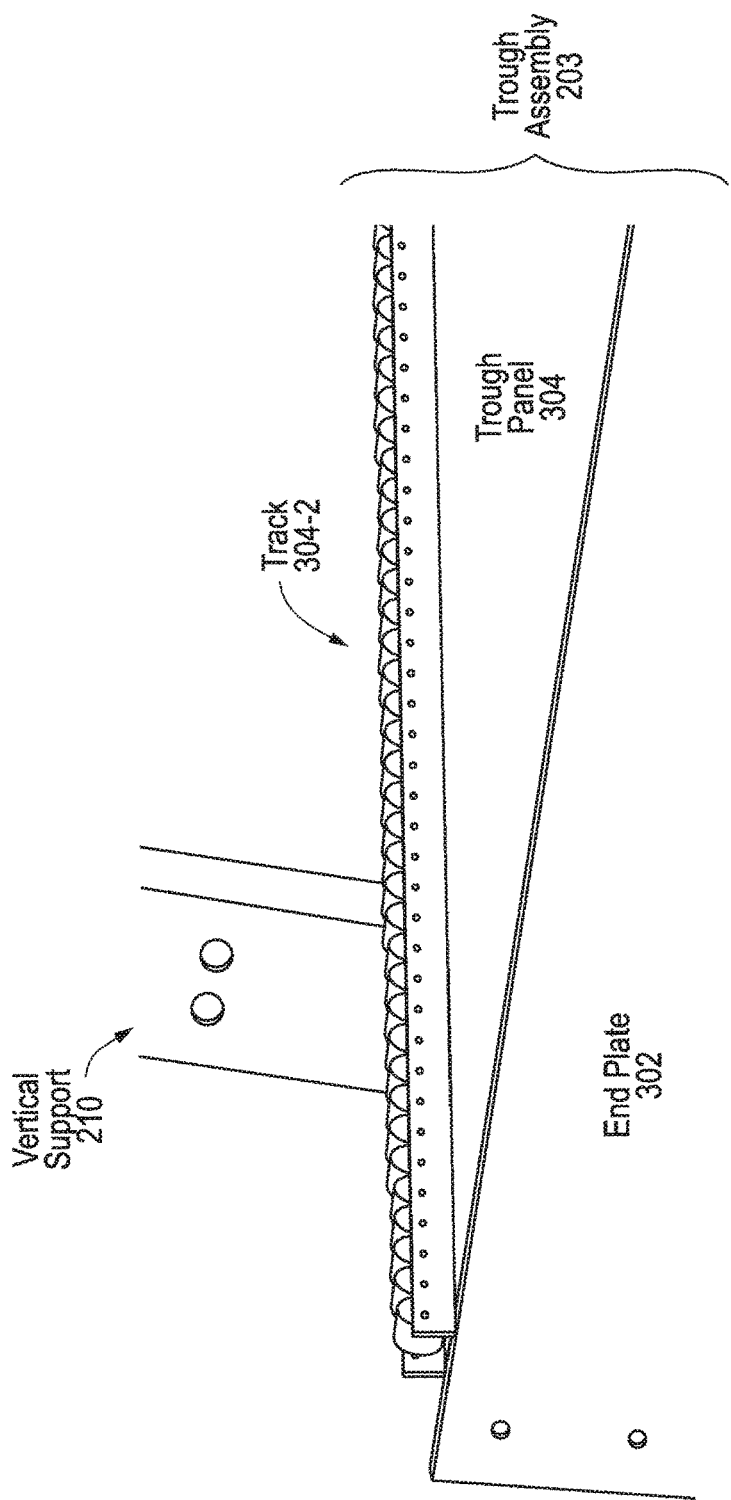
Figure 5:
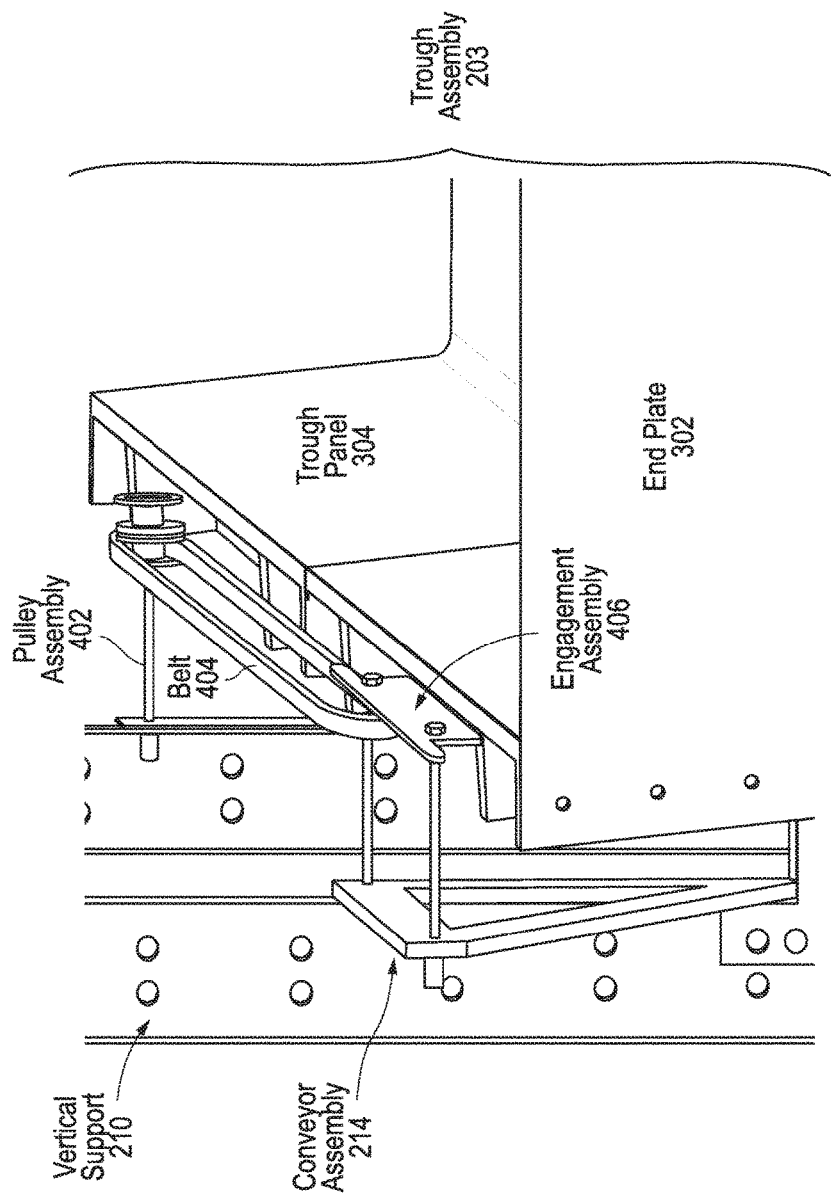
FIG. 5 is a magnified view of the conveyor assembly of FIG. 2.
Figure 9:
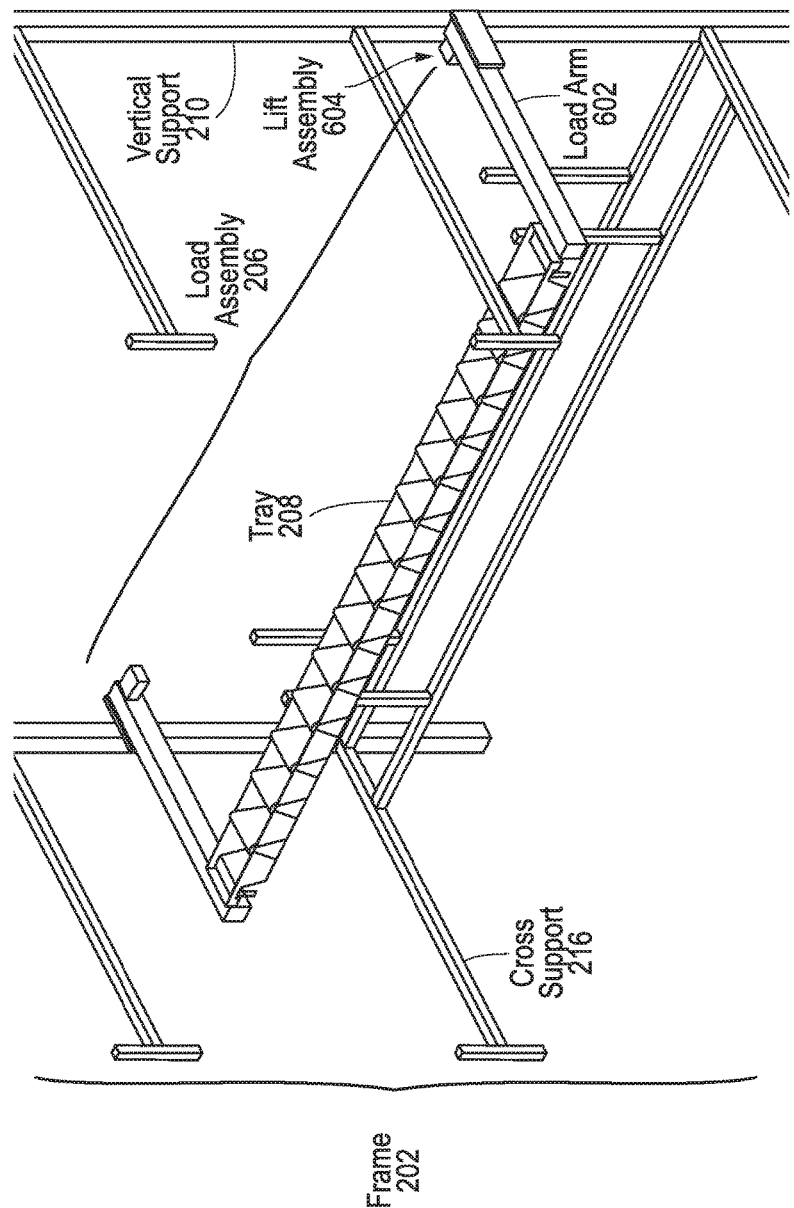
FIG. 9 is a view depicting the load assembly of FIG. 2 is greater detail.

Refer now to the drawings wherein depicted elements are, for the sake of clarity, not necessarily shown to scale and wherein like or similar elements are designated by the same reference numeral through the several views.

To preface, hydroponic systems have several advantages over conventional agriculture techniques. For example, soil-based vegetable farms draw overhead irrigation water from non-potable, highly exposed water sources such as rivers, lakes, ditches, and hillside ponds. Because hydroponic systems do not apply water and nutrients directly to edible portion of the crop, microbial contamination is reduced. Hydroponic systems also use approximately 10% of the land area and 5% of the water volume of conventional crop cultivation systems and thus are suitable for urban gardening and gardening in special environmental conditions (such as drought, infertile soil, relatively low exposure to sunlight, and the like). Hydroponic systems can also operate year round regardless of ambient conditions and can produce non-native crops. Hydroponic systems operate in controlled environments that are more resistant to man-made and natural disasters and sustain rare and endangered crop species. Hydroponic systems can also reduce crop production time. For example, butterhead lettuce varieties can be produced in about 30 days, rather than a 60-day growing period needed for conventional butterhead lettuce cultivation systems. Hydroponic systems are adaptable to concentrate crop production on particular crops to meet specific demands. Hydroponic systems allow agriculture to take large innovative steps toward environmental sustainability. Because hydroponic systems are mostly-closed-loop systems, nutrient effluent leaving the facility is greatly reduced. Additionally, fish, plant, and other waste solids may be captured and converted into value-added fertilizer products for wholesale or retail sale.

Turning to FIGS. 2-9, an example automated hydroponics system 200 according to this disclosure can be seen. As shown in this example, the system 200 includes a frame 202 with tiers. For example, eight tiers are shown. The frame 202 is generally comprised of frame sections, which themselves are generally comprised of vertical supports 210 and cross supports 216. Between the frame sections, there can be horizontal supports 212 (which are typically secured to vertical supports 210). The horizontal supports 212 generally form the tiers.

Within these tiers, trough assemblies 203 are typically secured. The trough assemblies 203 are generally formed such that there is a reservoir of water. This water is typically nutrient rich water (selected for the chosen plants) and recirculated. Feed systems or feed assemblies for performing this recirculation are well known and are associated with the description of FIG. 1. The trough assemblies 203 are typically formed of end plates 302 (one on each end, for example) trough segment 305. The trough segment 305, for example, has a general horizontal bottom 504 with two generally upright sides 506. Along each edge the trough segment 305 are bolt surfaces 508 (which allow additional trough segments 305 or end plates 302 to be bolted thereto). As a result, the length of the trough assemblies 203 is variable. Additionally, along the generally upright edges of the trough assemblies 203, tracks 304 can be used. These tracks 304 generally provide a low-friction engaging surface for trays 208 and can take the form of a generally flat skid track 304-1 or a roller bearing track 304-2 (which includes a general u-shaped channel with roller bearings secured therein).

A conveyor assembly 214 can also be secured to the frame 202 instead of simply pushing the trays 208 with the load assembly 206. The conveyor assembly 214 can, for example, include an engagement assembly 406, belt 404, and pulley assembly 402. The engagement assembly is, typically, able to engage trays 208 placed in a trough assembly 203 such that it is able to move the tray by action of the belt 404 and pulley assembly 402. Such an arrangement allows for a "conveyor belt" of sorts for trays 208 of plants—allowing for substantially continuous removal of trays 208 with more mature plants and addition of new trays 208 (e.g. with seedlings). Trays 208 of plants can be placed in the trough assemblies 203 and migrated from one end of the trough assembly 203 to the other as trays 208 of matured plants are removed. Additionally, each end of each tray 208 can include a rigid block to provide separation between trays.

Typically, the trays 208 have openings 502 in the bottom to allow the roots access to the nutrient rich water or fluid. The tray 208, for example, is 94.5 inches wide, 6 inches long, and 4.1 inches deep and extends across the width of the trough assembly 203. As an example, the trough segment 305 is 94 inches wide, 48 inches long, and 12 inches deep.

To move the trays 208 between tiers (or on and off tiers), a load assembly 206 can be employed. The load assembly 206 is typically comprised of opposing load arms 602 and lift assemblies 604, which can both lift and push trays 208. Typically, the lift assemblies 604 are secured to move along vertical supports 210. The load arms 602 can engage the ends of trays 208 and move the trays laterally, while the lift assemblies 604 can move the load arms 603 vertically. That way, the load assemblies 206 can move trays 208 with more mature plants off and trays 208 with fresh plants (e.g., seeds or seedlings) onto the tiers—allow for a substantially continuous conveyor system of plants.

As will be understood by those skilled in the art, the hydroponics automation system described herein can be utilized with components of aquaponic systems discussed herein. Although the present disclosure has been described with an exemplary embodiment, various changes and modifications may be suggested to one skilled in the art. It is intended that the present disclosure encompass such changes and modifications as those that fall within the scope of the appended claims.

What is claimed is:

1. An apparatus comprising:
   a frame having a plurality of tiers;
   a plurality of trough assemblies, wherein each trough assembly is secured to the frame and positioned in at least one of the tiers, and wherein each trough assembly includes at least one reservoir dimensioned by first and second end plates with at least one trough segment secured therebetween;
   a load assembly that is aligned with the frame, wherein the load assembly is secured to the frame and is configured to access each of the tiers, and wherein the load assembly includes first and second arms that are spaced apart at a predetermined distance dimensioned so as to load or unload at least one tray at the associated ends of the tray from at least one of the plurality of trough assemblies;
   a plurality of conveyor assemblies, wherein each conveyor assembly is secured to the frame and is associated with at least one tier, and wherein each conveyor assembly is configured to engage and transfer at least one tray across its associated trough assembly;
   a feed assembly that is configured to provide nutrient laden water to the plurality of trough assemblies.

2. The apparatus of claim 1, wherein the each trough assembly further comprises first and second tracks that are configured to engage at least one tray.

3. The apparatus of claim 2, wherein the frame further comprises:
   a plurality of frame sections, wherein each frame section includes a plurality of vertical support members interconnected to a plurality of cross support members; and
   a plurality of horizontal support members, wherein each horizontal support member is secured to at least two frame sections, and wherein each horizontal support member spans the distance between its associated frame sections, and wherein the plurality of horizontal support members are divided into a plurality of sets of horizontal frame members, and wherein each set of horizontal frame members forms at least one of the tiers.

4. The apparatus of claim 3, wherein each of the first and second arms of the load assembly further comprises a lift assembly, wherein each lift assembly is secured to at least one of the vertical support members so as to allow its associated arm to access each of the tiers.

5. The apparatus of claim 4, wherein the first and second tracks further comprise low-friction skid tracks.

6. The apparatus of claim 4, wherein each of the first and second tracks further comprises:
   a u-shaped channel; and
   a plurality of roller bearings, wherein the roller bearings are secured within the u-shaped channel.

7. The apparatus of claim 4, wherein each conveyor assembly further comprises:
   a horizontal support that is adapted to engage at least one tray;
   a pulley assembly; and
   a belt that is secured to the horizontal support and pulley assembly.

8. The apparatus of claim 7, the trough segment further comprise a plurality of trough segments, and wherein the load assembly is secured to the frame, and wherein the first and second end plates and the plurality of trough segments are bolted together.

9. An apparatus comprising:
   a frame having a plurality of tiers;
   a plurality of trough assemblies, wherein each trough assembly is secured to the frame and positioned in at least one of the tiers, and wherein each trough assembly includes:
      a first end plate;
      a plurality of trough segments that are secured to one another in a sequence, wherein the first end plate is secured to the first trough segment of the sequence; and
      a second end plate that is secured to the last trough segment of the sequence;
   a plurality of sets of trays, wherein each set of trays is positioned within at least one of the trough assemblies and extends across the approximate length of its associated trough assembly;
   first and second load assemblies that are each secured to the frame at its associated first and second ends, wherein each load assembly is configured to access each of the tiers, and wherein each load assembly includes first and second arms that are spaced apart at a predetermined distance dimensioned so as to load or unload at least one of the trays at the associated ends of the tray from at least one of the trough assemblies;
   a plurality of conveyor assemblies, wherein each conveyor assembly is secured to the frame and is associated with at least one tier, and wherein each conveyor assembly is configured to engage and transfer at least one tray across its associated trough assembly;
   a feed assembly that is configured to provide nutrient laden water to the plurality of trough assemblies.

10. The apparatus of claim 9, wherein the trough assembly further comprises first and second tracks that are configured to engage at least one tray.

11. The apparatus of claim 10, wherein the frame further comprises:
   a plurality of frame sections, wherein each frame section includes a plurality of vertical support members interconnected to a plurality of cross support members; and
   a plurality of horizontal support members, wherein each horizontal support member is secured to at least two frame sections, and wherein each horizontal support member spans the distance between its associated frame sections, and wherein the plurality of horizontal support members are divided into a plurality of sets of horizontal frame members, and wherein each set of horizontal frame members forms at least one of the tiers.

12. The apparatus of claim 11, wherein each of the first and second arms of each load assembly further comprises a lift assembly, wherein each lift assembly is secured to at least one of the vertical support members so as to allow its associated arm to access each of the tiers.

13. The apparatus of claim 12, wherein the first and second tracks further comprise low-friction skid tracks.

14. The apparatus of claim 11, wherein each of the first and second tracks further comprises:
   a u-shaped channel; and
   a plurality of roller bearings, wherein the roller bearings are secured within the u-shaped channel.

15. The apparatus of claim 11, wherein each conveyor assembly further comprises:
   a horizontal support that is adapted to engage at least one tray;
   a pulley assembly; and
   a belt that is secured to the horizontal support and pulley assembly.

* * * * *